C. SINGER.
SHOVEL.
APPLICATION FILED DEC. 26, 1917.
1,263,949.
Patented Apr. 23, 1918.
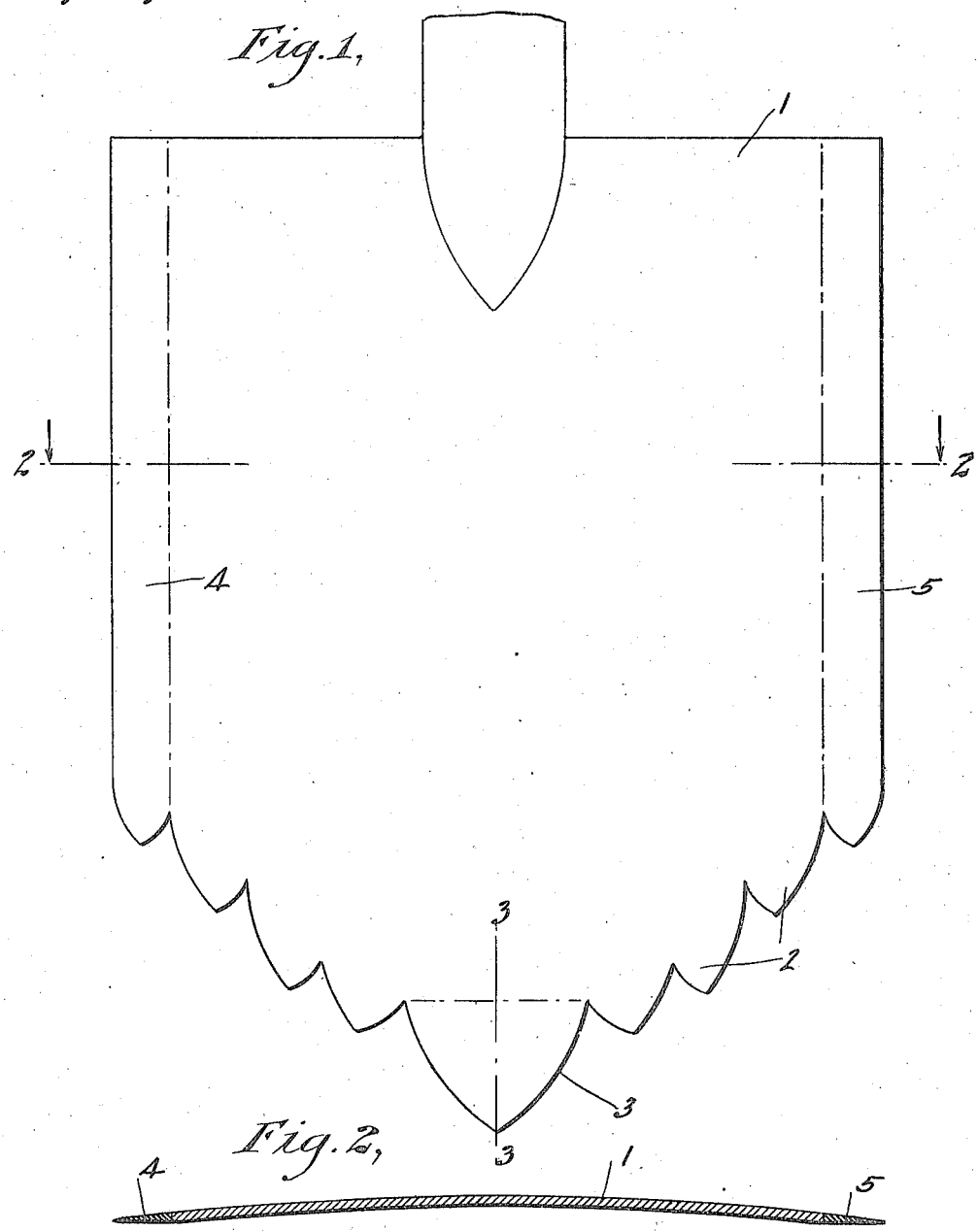
Fig. 1,
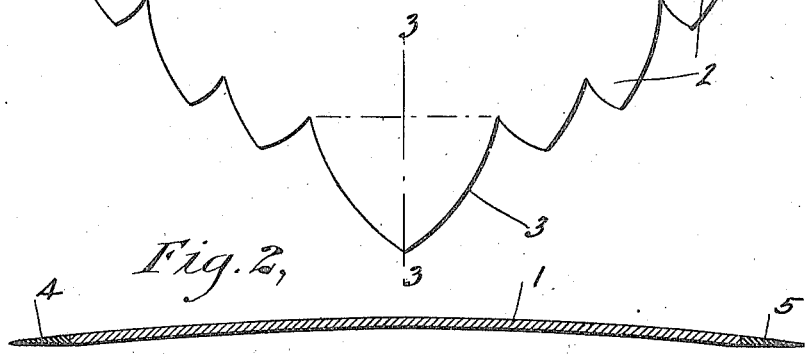
Fig. 2,
Fig. 3.
WITNESSES
Edw. Thorpe
A. L. Kitchin
INVENTOR
Charles Singer
BY
ATTORNEYS

UNITED STATES PATENT OFFICE.

CHARLES SINGER, OF NEW YORK, N. Y.

SHOVEL.

1,263,949.

Specification of Letters Patent.   Patented Apr. 23, 1918.

Application filed December 26, 1917. Serial No. 208,820.

*To all whom it may concern:*

Be it known that I, CHARLES SINGER, a citizen of the United States, and a resident of the city of New York, Woodhaven, borough of Queens, in the county of Queens and State of New York, have invented a new and Improved Shovel, of which the following is a full, clear, and exact description.

This invention relates to shovels and has for an object the provision of an improved arrangement of sharpened projections at different points so that the shovel may operate against the earth and foreign matter therein with comparative ease.

Another object of the invention is to provide a shovel with members on each edge sharpened so as to produce cutting members.

A still further object of the invention is to provide a shovel with a sharpened pointed tooth or projection arranged centrally of the bottom.

In the accompanying drawing:

Figure 1 is a front view of the shovel disclosing an embodiment of the invention.

Fig. 2 is a section through Fig. 1, same being taken on line 2—2.

Fig. 3 is a detail fragmentary sectional view through Fig. 1 on line 3—3.

Referring to the accompanying drawing by numerals, 1 indicates the body of the shovel which is cut at the bottom for producing teeth or projections 2. A central projection 3 may be cut from the body 1, but preferably is made from a different and better grade of material and welded or otherwise rigidly secured to the body. The teeth 2 may be sharpened or may not be sharpened as preferred, but the tooth 3 is preferably sharpened on both edges so as to easily enter even very hard ground and to act properly against stones, roots, and the like. Where comparatively large roots are engaged in smooth ground the point 3 is necessary, ordinarily in excavating an ax or other instrument is necessary when a root of an appreciable size is reached, and in order to have the shovel in the present invention act on roots of an appreciable size cutting members are provided on each edge of the body 1. These cutting members are made of comparatively good steel and welded, riveted or otherwise rigidly secured to the body 1 and sharpened as shown in Fig. 2. These members are also preferably extended directly outwardly in diametrically opposite directions instead of following the curvature of the body 1, as clearly shown in Fig. 2.

The use of the teeth 2 in addition to tooth 3 helps, or rather presents, a structure which will permit a more ready entrance of the shovel into even hard earth, as the points first enter gradually and a larger surface is brought in contact with the earth. The shovel is intended for general use, but particularly designed to be used in hurriedly dug trenches, as for instance in warfare, where different instruments, as for instance, picks and axes are not convenient as shovels. In digging trenches in woods roots are encountered very often, and in digging trenches in other places stones and other objectionable matter is encountered so that the construction of the point 2 is very desirable in that it permits easy removal of stones, and the cutting members 4 and 5 permit the cutting of roots of most any size without resorting to an ax or other regular cutting instrument.

It is obvious from the foregoing that a toothed shovel of the present character will be highly useful both as an entrenching tool and a commercial implement, and that it will be particularly effective in either use as a shovel, by virtue of the fact that the two series of smaller teeth are curved so as to successively bite into the ground when in use at opposite sides of the larger central tooth, and further by virtue of the fact that each of the teeth has two convex cutting edges and has its apex pointed in a direction approximately parallel to the longitudinal axis of the shovel.

As above stated, the tool may be used both as a trench shovel and as a usual commercial shovel, in the former of which uses the side edges are sharpened. In its use as a commercial shovel, the sharpened edges while not essential, add to its effectiveness as they produce flattened side portions which include the outermost teeth of the two side series of teeth, as will be apparent from a comparison of Figs. 1 and 2, and which relieve the pressure of the material as the shovel enters the ground as would otherwise occur if the full concave were carried from one side edge entirely to the other.

What I claim is:

1. A shovel having a body provided with a central tooth at one end and with teeth arranged in curved series at opposite sides of said central tooth, each of said central and side teeth having two convex cutting edges and having its apex pointed in a direction approximately parallel to the longitudinal axis of the body.

2. A shovel having its body provided with a curved toothed end of which the teeth have convex side cutting edges and sharpened points projecting in directions parallel to the longitudinal axis of the body, said body having longitudinal flattened side edge portions extending to its said toothed end and including the two outer side teeth, as described.

CHARLES SINGER.